United States Patent [19]
Müller

[11] Patent Number: 5,896,781
[45] Date of Patent: Apr. 27, 1999

[54] VEHICLE OPERATING PEDAL UNIT

[75] Inventor: Martin Müller, Denkendorf, Germany

[73] Assignee: Daimler-Benz AG, Stuttgart, Germany

[21] Appl. No.: 08/902,732

[22] Filed: Jul. 30, 1997

[30] Foreign Application Priority Data

Aug. 2, 1996 [DE] Germany .......................... 196 31 212

[51] Int. Cl.⁶ ............................ G05G 1/14; B60K 28/10; F16D 13/76
[52] U.S. Cl. ............................... 74/512; 74/513; 74/560; 192/14; 180/274
[58] Field of Search ............................ 74/512, 513, 514, 74/560; 180/274, 275, 276, 278, 286; 192/12 R, 13 A, 14, 16; 188/371, 375

[56] References Cited

U.S. PATENT DOCUMENTS

| | | | |
|---|---|---|---|
| 4,027,914 | 6/1977 | Yamamoto | 296/78.1 |
| 4,353,430 | 10/1982 | Sjoqvist | 180/90 |
| 4,819,500 | 4/1989 | Musumiya | 74/513 |
| 5,575,181 | 11/1996 | Baumann | 74/512 |
| 5,588,332 | 12/1996 | Hedderly | 74/493 |
| 5,778,732 | 7/1998 | Patzelt | 74/512 |

FOREIGN PATENT DOCUMENTS

| | | |
|---|---|---|
| 0 430 600 | 6/1991 | European Pat. Off. . |
| 195 01 859 | 7/1996 | Germany . |
| WO 94/29584 | 12/1994 | WIPO . |

*Primary Examiner*—Charles A. Marmor
*Assistant Examiner*—Roger Pang
*Attorney, Agent, or Firm*—Klaus J. Bach

[57] ABSTRACT

In a vehicle operating pedal unit, which may include clutch and brake pedals, mounted on a front wall of a vehicle passenger compartment and including a pedal support structure on which the pedals are pivotally supported by bolts, the pedal support structure includes a portion which extends upwardly so as to be disposed on top of a transverse frame member to which it is mounted and which is sufficiently strong to withstand forces to which a brake unit mounted on the opposite side of the front wall may be subjected during a crash. At least the brake pedal has an extension projection to a point adjacent the transverse frame member to prevent the brake pedal from being tilted by a brake operating rod into the leg room of the vehicle if the brake unit and the operating rod are pushed inwardly during a crash.

2 Claims, 2 Drawing Sheets

VEHICLE OPERATING PEDAL UNIT

BACKGROUND OF THE INVENTION

The invention relates to a pedal unit for operating a vehicle with a clutch and a brake pedal supported in a support structure which can be mounted on a wall, particularly the front wall of the passenger compartment of a motor vehicle.

EP 04 30 600 A1 discloses a pedal unit with at least one pedal and a pedal lever connected hereto. It is the object of the pedal unit to facilitate the mounting which is achieved by the use of various molded plastic parts including the housing and the pedals. The pedals are pre-mounted onto the housing so as to form a unit which can then be mounted to a part of the vehicle.

Furthermore, WO 94/29584 A1 discloses a pedal unit for operating a vehicle with which there is no need for a direct mechanical connection between the pedal and the vehicle drive unit. This is achieved by the combination of simple mechanical parts with a position sensor.

However, the vehicle operating pedal units known from these references have the disadvantage that, during a crash, they can be pushed far into leg room of the passenger compartment since the brake unit and the operating rod associated therewith transmit the forces occurring during a crash to the pedals and the pedals can be tilted, because of their support points and the orientation of the brake operating rod, about the mounting points of the brake pedal unit such that they move far into the leg room of the passenger compartment. This may result in injuries particularly to the legs of the driver.

It is therefore the object of the present invention to provide a vehicle operating pedal unit by which, in case of a crash, the vehicle operator is not subjected to injuries resulting from a movement of the pedals into the legroom of the vehicle.

SUMMARY OF THE INVENTION

In a vehicle operating pedal unit which may include clutch and brake pedals mounted on a front wall of a vehicle passenger compartment and including a pedal support structure on which the pedals are pivotally supported by bolts, the pedal support structure includes a portion which extends upwardly so as to be disposed on top of a transverse frame member to which it is mounted and which is sufficiently strong to withstand forces to which a brake unit mounted on the opposite side of the front wall may be subjected during a crash and at least the brake pedal has an extension projection to a point adjacent the transverse frame member to prevent the brake pedal from being tilted into the leg room of the vehicle if the brake unit and an operating rod are pushed inwardly during a crash.

With the extension of the pedal support member up to a rigid transversely extending frame member and the attachment of the pedal support member to the frame member and the provision of a stop, a vehicle operating pedal unit is provided which cannot tilt inwardly into the leg room of the passenger compartment of a vehicle if the vehicle becomes involved in a crash. Instead of being mounted, as usual, on a relatively thin front wall, the pedal support structure is mounted on a transverse frame member which is normally present in a vehicle. For this purpose, for example the transverse frame member may be used which normally extends below the windshield of a vehicle anyhow. The arrangement effectively prevents the inward tilting of the pedals into the leg room of the passenger compartment.

Advantageous embodiments of the invention will be described in greater detail below on the basis of the accompanying drawings.

DESCRIPTION OF A PREFERRED EMBODIMENT

Figure 1:
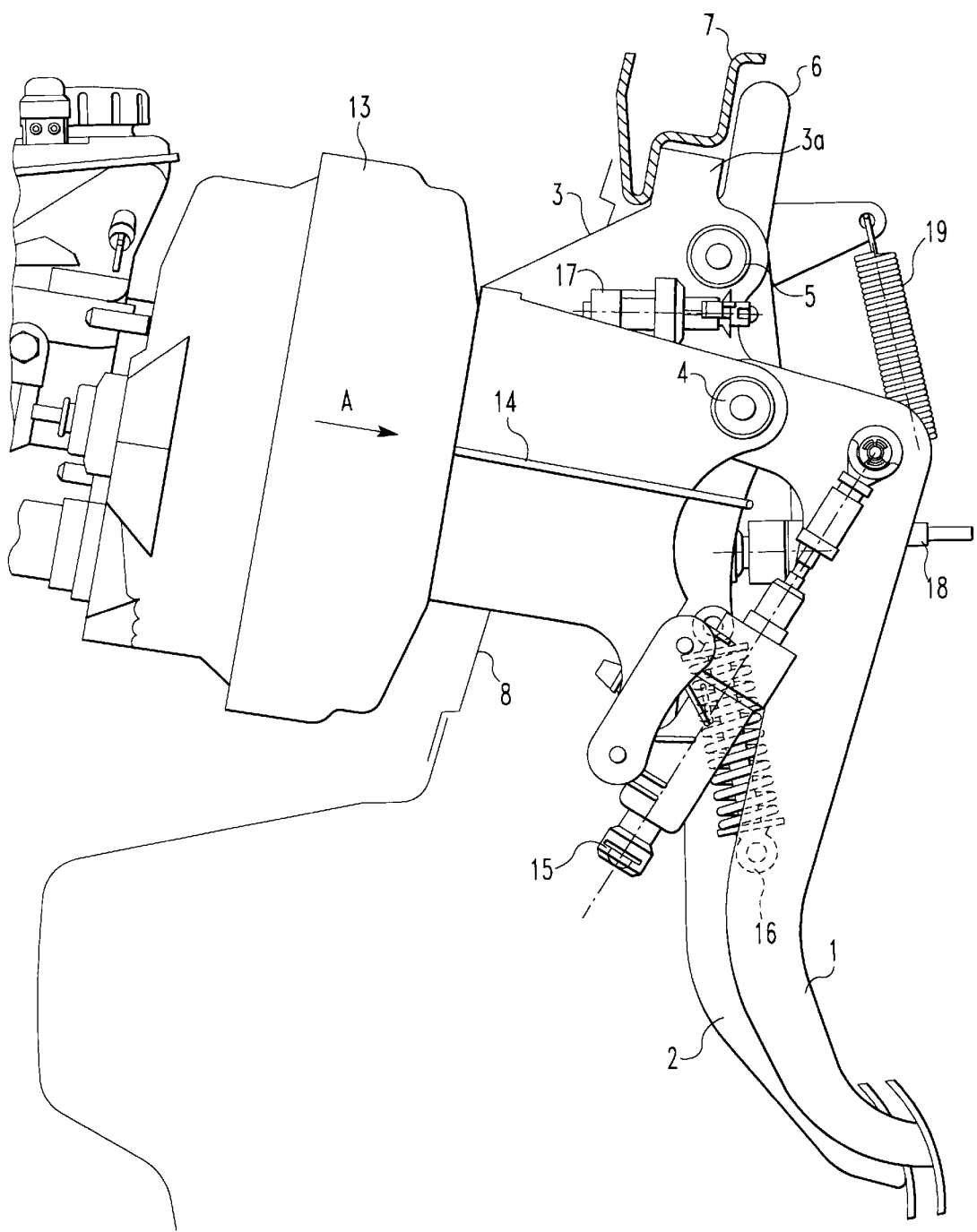
FIG. 1 is a side view of a pedal unit according to the invention.
Figure 2:
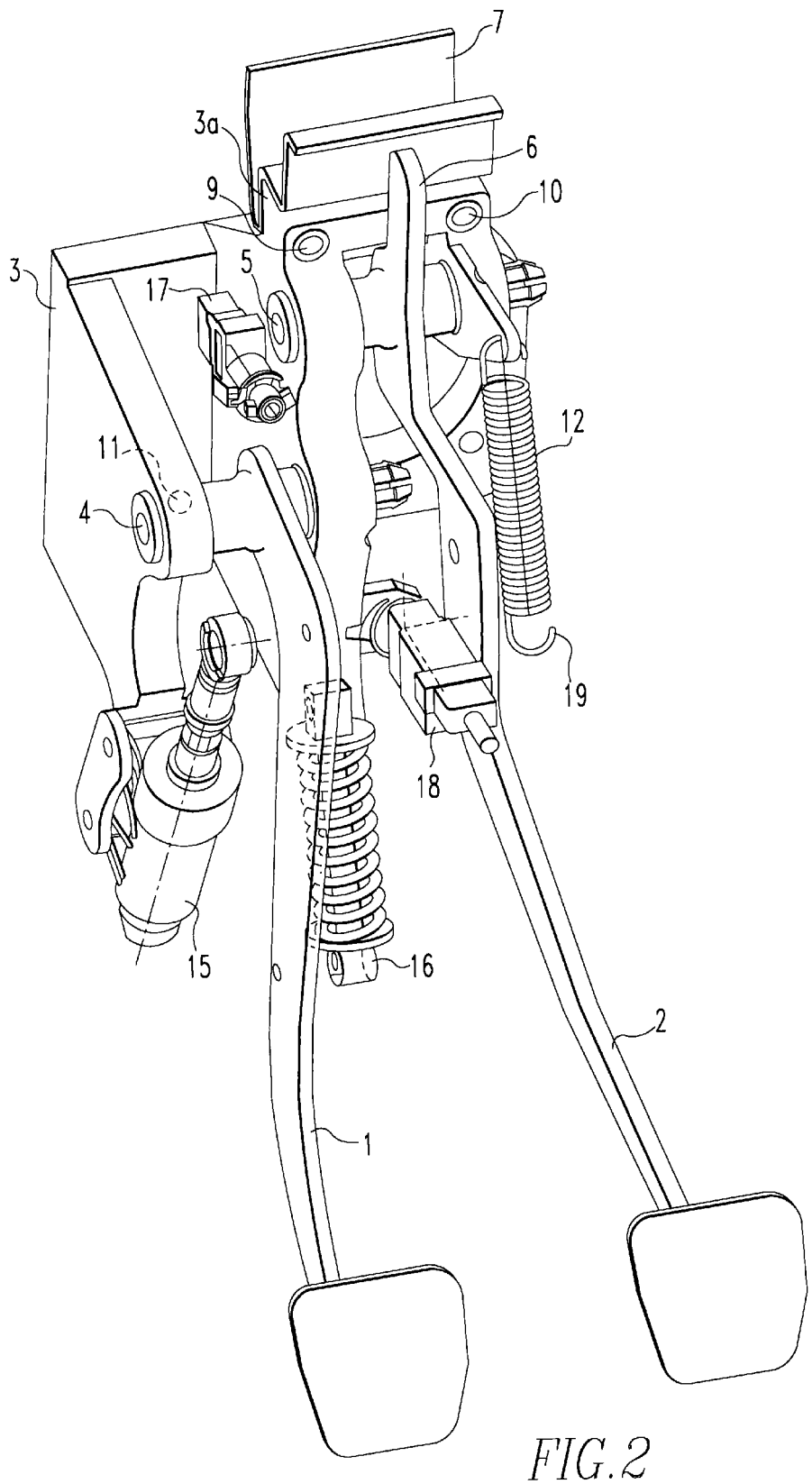
FIG. 2 is a perspective view of the pedal unit according to the invention.

As shown in FIGS. 1 and 2, a coupling pedal 1 and a brake pedal 2 are supported on a pedal support structure 3 by way of support bolts 4 and 5 which preferably consist of plastic material. The bolt 4 extends through a bore in the support structure 3 and a bore in the clutch pedal 1 and the bolt 5 extends through another bore in the support structure 3 and a bore in the brake pedal 2.

At its upper end, the brake pedal 2 has an extension forming a stop member 6. The stop member 6 is so formed on the prdal that, as seen from the vehicle operators view, it is disposed directly in front of a transverse frame member 7 of the vehicle when the pedal unit is mounted on the front wall of a vehicle passenger compartment.

The transverse frame member 7 may be disposed, for example, below a windshield which is not shown in the drawings. The support structure 3 has at its top end a projection 3a and is mounted on the transverse frame member 7 and on the front wall 8. For mounting the support structure 3 on the transverse frame member 7, the support structure 3 or respectively, the projection 3a includes bores 9 and 10. For mounting the support structure 3 on the front wall 8 the support structure includes bores 11 and 12. The bores 9 to 12 are in alignment with bores in the transverse frame member 7 and in the front wall 8. The bolts or screws extending through these bores for mounting the operating pedal unit are not shown in the drawings.

Behind the pedal support structure 3 and the front wall as seen from the vehicle operator, there is the power brake unit 13 which is connected to the brake pedal 2 by means of an operating rod 14.

For the operation of the clutch, a hydraulic cylinder 15 is arranged between the support structure 3 and the clutch pedal 1 as it is known in the art. A spring element 16 is also disposed between the support structure 3 and the clutch pedal 1 for supporting the clutch operation. The support structure 3 further includes a clutch switch 17 which is also known in the art.

The brake pedal 2 is provided with a brake light switch 18 and a return spring 19 as it is also known in the art.

Below, it will be described what happens to the operating pedal unit during a crash:

During a crash, the brake unit will be moved in the direction of the arrow A. Together therewith the operating rod 14 is moved in the same direction. This movement is transferred by the operating rod 14 to the pedals 1, 2 in the direction toward the vehicle operator. Because of the mounting of the pedals 1, 2 by the bolts 4, 5, this movement would, with arrangement according to the state-of-the-art, result in a pivot movement of the pedals 1, 2.

However, with the stop member 6 on the brake pedal 2, this pivot movement is prevented since the stop member 6 engages the transverse frame member 7 right at the begin of such a pivot movement. The bolts 4 and 5 are so designed that they break when, after engagement of the stop member 6 with the transverse frame member 7, a predetermined force or load is exceeded whereby the pedals 1 and 2 mounted by these bolts 4 and 5 are released. This can be achieved for example by providing bolts 4 and 5 of plastic material. As a result, the pedals 1 and 2 cannot transmit the force, which is transferred to them by the operating rod 14, to the vehicle operator. Rather, as a result of gravity, they fall down onto the floor of the vehicle.

Movement of the support structure 3 into the leg room of the vehicle is further prevented because the support structure is not only mounted onto the front wall 8 as this is commonly done, but also to the transverse frame member 7. The transverse frame member 7 is by far more rigid than the front wall 8. As a result, the support structure 3 for the pedals remains firmly attached to the transverse frame member 7 during a crash.

With the arrangement described, movement of the operating pedal unit into the legroom of a motor vehicle during a crash is safely prevented so that injuries to an operator which may be caused by the movement of the pedals into the legroom are effectively prevented.

What is claimed is:

1. A vehicle operating pedal unit installation, comprising a pedal unit including clutch and brake operating pedals, mounted onto a wall defining the front end of a passenger compartment of a vehicle, said vehicle operating pedal unit comprising a pedal support structure having a portion extending upwardly and being mounted with its upwardly extending portion onto a rigid transverse frame member which extends transversely with respect to said passenger compartment, at least one of said operating pedals having an upwardly extending part forming a stop member disposed, as seen from a vehicle operator, in front of, and closely adjacent to, said transverse frame member to prevent tilting of said at least one operating pedal toward the vehicle operator during a vehicle accident, said pedals being mounted on said support structure by bolts which are designed to break when subjected to forces greater than a predetermined value as they may occur during a crash, for releasing pedals.

2. A pedal unit installation according to claim 1, wherein said bolts consist of plastic material.

* * * * *